(12) United States Patent
Calippe et al.

(10) Patent No.: US 9,381,436 B2
(45) Date of Patent: Jul. 5, 2016

(54) MECHANISM FOR IMPLEMENTING CLOUD LOCAL AREA NETWORK PARTY SERVICE FOR MULTI-PLAYER CONTENT/GAME ENVIRONMENT

(71) Applicant: Google Inc., Mountain View, CA (US)

(72) Inventors: Joel Calippe, San Jose, CA (US); Gurudas Somadder, San Jose, CA (US)

(73) Assignee: Google Inc., Mountain View, CA (US)

( * ) Notice: Subject to any disclaimer, the term of this patent is extended or adjusted under 35 U.S.C. 154(b) by 170 days.

(21) Appl. No.: 14/203,970

(22) Filed: Mar. 11, 2014

(65) Prior Publication Data

US 2014/0274407 A1 Sep. 18, 2014

Related U.S. Application Data

(60) Provisional application No. 61/778,107, filed on Mar. 12, 2013.

(51) Int. Cl.
*A63F 9/24* (2006.01)
*A63F 13/32* (2014.01)
*H04L 29/08* (2006.01)
*H04L 29/06* (2006.01)
*A63F 13/795* (2014.01)

(52) U.S. Cl.
CPC ............... *A63F 13/32* (2014.09); *A63F 13/795* (2014.09); *H04L 67/10* (2013.01); *H04L 67/38* (2013.01)

(58) Field of Classification Search
CPC ........................................................ A63F 13/32
See application file for complete search history.

(56) References Cited

U.S. PATENT DOCUMENTS

| | | | | |
|---|---|---|---|---|
| 7,706,369 B2* | 4/2010 | Roese | ....................... | G01S 5/02 370/389 |
| 8,996,723 B2* | 3/2015 | Li | .......................... | H04L 67/104 709/218 |
| 2012/0072727 A1* | 3/2012 | Redlich | ............... | H04L 12/2856 713/168 |
| 2013/0247157 A1* | 9/2013 | Selgas | ..................... | H04L 29/06 726/5 |

\* cited by examiner

Primary Examiner — Steve Rowland

(57) ABSTRACT

Disclosed is a method for implementing a cloud local area network (C-LAN) for providing a multi-player environment for servicing content to a plurality of client devices including determining a location of a blade for each client device of the plurality of client devices, configuring a service access point for each client device of the plurality of client devices, and initializing the C-LAN using the service access points for each client device of the plurality of client devices, wherein at least two client devices of the plurality of client devices cannot be associated with a same local area network based on their respective internet service providers.

19 Claims, 8 Drawing Sheets

MECHANISM FOR IMPLEMENTING CLOUD LOCAL AREA NETWORK PARTY SERVICE FOR MULTI-PLAYER CONTENT/GAME ENVIRONMENT

CROSS-REFERENCE TO RELATED APPLICATIONS

The present application claims the benefit of U.S. Provisional Patent Application 61/778,107 filed on Mar. 12, 2013, which is hereby incorporated by reference in its entirety.

FIELD OF THE INVENTION

The invention relates to the field of local area networks, and in particular to a mechanism for implementing a cloud local area network.

BACKGROUND

Remote gaming is a mechanism by which end-users (service subscribers) using their own client devices at their disposal interact with the target game that is actually running on a blade at a remote location (e.g., data center). User inputs may be transmitted to the data center, where game instructions are generated and graphics are rendered and transmitted back to the client. When users wish to interact with other users in a multi-player environment, games typically either take advantage of the fact that all users are on the same local area network (LAN) or make use of an external brokerage service to service the multi-player gameplay. Typically, a LAN is limited to being formed amongst those who utilize the same internet service provider (ISP) and are serviced by the same data center associated with that ISP. In some situations, a LAN is further limited to being formed amongst those users who utilize the same internet service provider (ISP), are serviced by the same data center associated with that ISP, and who are serviced by blades (e.g., individual processing entities of the data center) that are in close proximity to each other within the data center. This limits the set of users that may interact in a multi-player environment to those who share the characteristics described above.

Users of client devices that cannot be associated with the same LAN (e.g., those users who do not share the characteristics above) based on the remote gaming environments provided by their respective internet service providers may still interact in a multi-player environment. This may be accomplished by utilizing a third party server which creates a separate LAN for those users to interact. However, such third party servers require additional subscription fees and costs in addition to those that the users are already paying to their ISP.

SUMMARY

Some embodiments of the present invention are directed to a mechanism for implementing a cloud local area network for users of client devices who cannot be associated with the same local area network (LAN) based on the remote gaming environments provided by their respective internet service providers.

Further details of aspects, objects and advantages of the invention are described below in the detailed description, drawings and claims. Both the foregoing general description and the following detailed description are exemplary and explanatory and are not intended to be limiting as to the scope of the invention.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

DETAILED DESCRIPTION

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments" in various places throughout this specification are not necessarily referring to the same embodiment or embodiments.

Some embodiments of the present invention are directed to a mechanism for implementing a cloud local area network for users of client devices who cannot be associated with the same local area network (LAN) based on the remote gaming environments provided by their respective internet service providers. In this way, users of client devices who cannot be associated with the same local area network (LAN) based on the remote gaming environments provided by their respective internet service provider can interact in a multi-player environment through the cloud local area network (C-LAN) without having to utilize a separate third party server.

Figure 1:
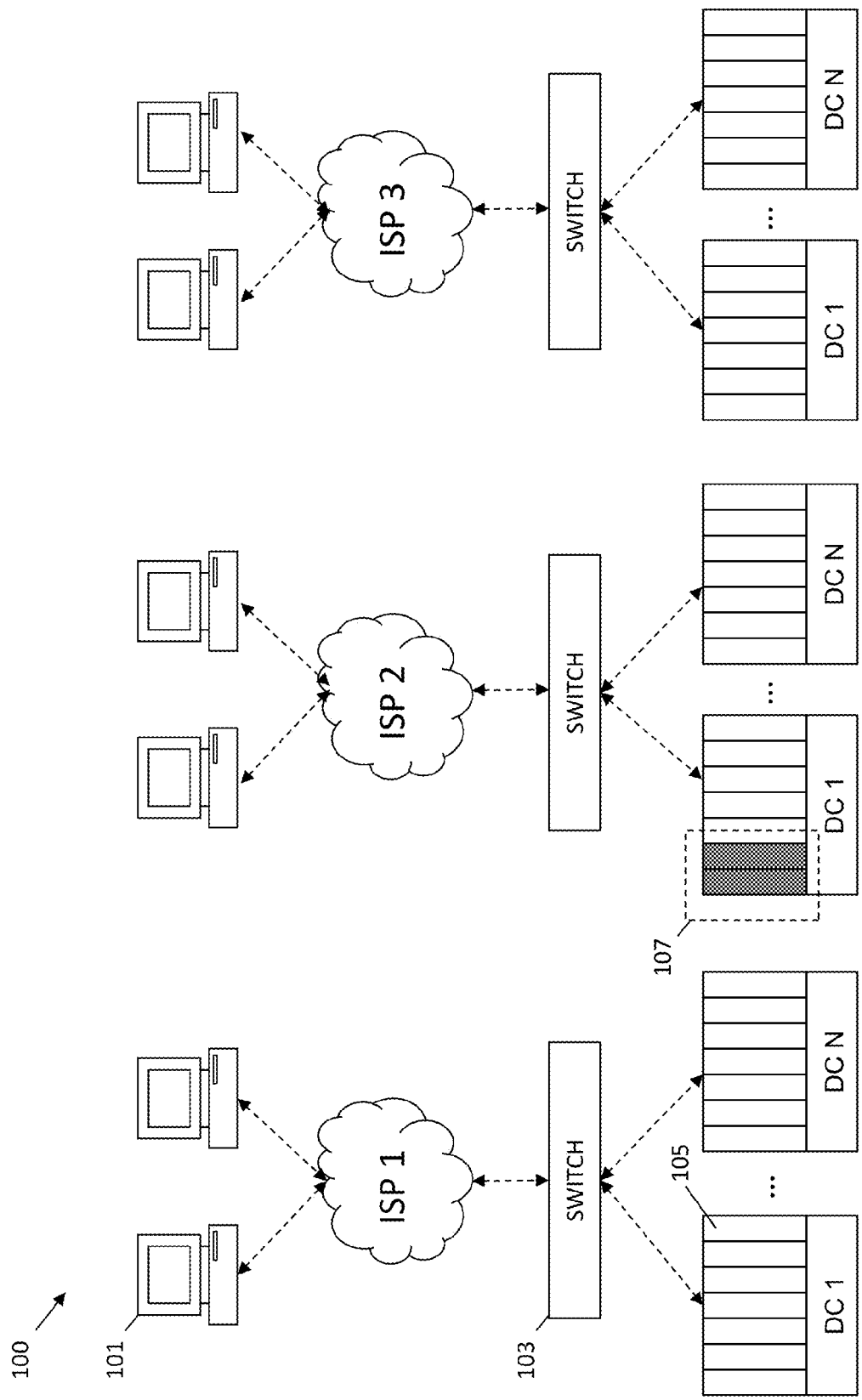
FIG. 1 illustrates an example remote gaming environment.

Remote gaming is a mechanism by which users of a client device interact with a game that is running at a remote location (e.g., data center). FIG. 1 illustrates an example remote gaming environment 100. The remote gaming environment 100 includes several client devices 101 and several internet service providers ISP1, ISP2, ISP3 with corresponding switches 103 and corresponding data centers DC. Each data center DC may include several blades 105 (e.g., individual processing entities of the data center DC) that may run games to service one or more client devices 101 at a time.

Each client device 101 may be associated with an internet service provider ISP1, ISP2, ISP3 that provides the infrastructure for servicing remote gaming for the client device 101. Each internet service provider ISP1, ISP2, ISP3 may be associated with a switch 103 that is utilized to assign client devices 101 to corresponding blades 105 of a data center DC. The switch 103 also serves the function of providing a gateway through which client devices 101 and blades 105 of a data center DC may communicate. While only a single switch 103 is depicted as being associated with each internet service provider ISP1, ISP2, ISP3, it is important to note that multiple switches 103 may be associated with an internet service provider ISP1, ISP2, ISP3, each of the multiple switches 103 being assigned to one or more corresponding data centers DC.

A game selected by a user of the client device 101 is then run on the blade 105 assigned to that client device 101. User inputs may be transmitted to the corresponding blade 105 via the switch 103, where game instructions are generated and graphics are rendered by the blade 105 and transmitted back to the client device 101.

Various criteria may be used to determine which blade 105 of a data center DC that a particular client device 101 is assigned to. For example, a client device 101 may be assigned to a particular data center DC that is in close physical proximity to that client device's 101 location. Additionally, the client device 101 may be assigned to a particular blade 105 of the data center DC based on the blade's 105 hardware capabilities (e.g., CPU or GPU processing power) and the client device's 101 hardware capability needs.

When a user of a client device 101 wishes to interact with other users in a multi-player environment, a local area network (LAN) 107 is formed to service the multi-player gameplay. Typically, a local area network (LAN) 107 is limited to being formed amongst those who utilize the same internet service provider ISP1, ISP2, ISP3 and are serviced by the same data center DC associated with that internet service provider ISP1, ISP2, ISP3. In some situations, a local area network (LAN) 107 is further limited to being formed amongst those users who utilize the same internet service provider ISP1, ISP2, ISP3, are serviced by the same data center DC associated with that internet service provider ISP1, ISP2, ISP3, and who are serviced by blades 105 that are in close proximity to each other within the data center DC as illustrated in FIG. 1. This limits the set of users that may interact in a multi-player environment to those who share the characteristics described above.

Users of client devices 101 that cannot be associated with the same local area network (LAN) 107 based on the remote gaming environments provided by their respective internet service providers ISP1, ISP2, ISP3 cannot interact in a multi-player environment using the remote gaming environment provided by their corresponding internet service provider ISP1, ISP2, ISP3. For example, users of client devices 101 that are assigned to blades 105 of the same data center DC that are not in close proximity to each other may not interact in a multi-player environment using the remote gaming environment provided by their corresponding internet service provider ISP1, ISP2, ISP3 because they cannot be associated with the same local area network (LAN) 107. Additionally, users of client devices 101 that are assigned to blades 105 of different data centers DC may not interact in a multi-player environment using the remote gaming environment provided by their corresponding internet service provider ISP1, ISP2, ISP3 because they cannot be associated with the same local area network (LAN) 107. Furthermore, users of client devices 101 that utilize different internet service providers ISP1, ISP2, ISP3 may not interact in a multi-player environment using the remote gaming environment provided by their corresponding internet service provider ISP1, ISP2, ISP3 because they cannot be associated with the same local area network (LAN) 107.

Users of client devices 101 that cannot be associated with the same local area network (LAN) based on the remote gaming environments provided by their respective internet service providers ISP1, ISP2, ISP3 may still interact in a multi-player environment utilizing a third party server which creates a separate LAN for those users to interact. However, such third party servers require additional subscription fees and costs in addition to those that the users are already paying to their internet service provider ISP, ISP2, ISP3 and as such are often an undesirable solution for increasing the set of users that are allowed to interact in a multi-player environment.

One way to allow users of client devices 101 to interact in a multi-player environment using the remote gaming environment provided by their corresponding internet service provider ISP1, ISP2, ISP3 when those client devices 101 cannot be associated with the same local area network (LAN) based on the remote gaming environments provided by their respective internet service providers ISP1, ISP2, ISP3 is to utilize a cloud local area network (C-LAN). This may be accomplished by using a cloud local area network party service (CLAPS) manager, which will be described in greater detail below. In this way, users of client devices who cannot be associated with the same local area network (LAN) based on the remote gaming environments provided by their respective internet service providers ISP1, ISP2, ISP3 can still interact in a multi-player environment through the cloud local area network (C-LAN) without having to utilize a separate third party server.

Figure 2:
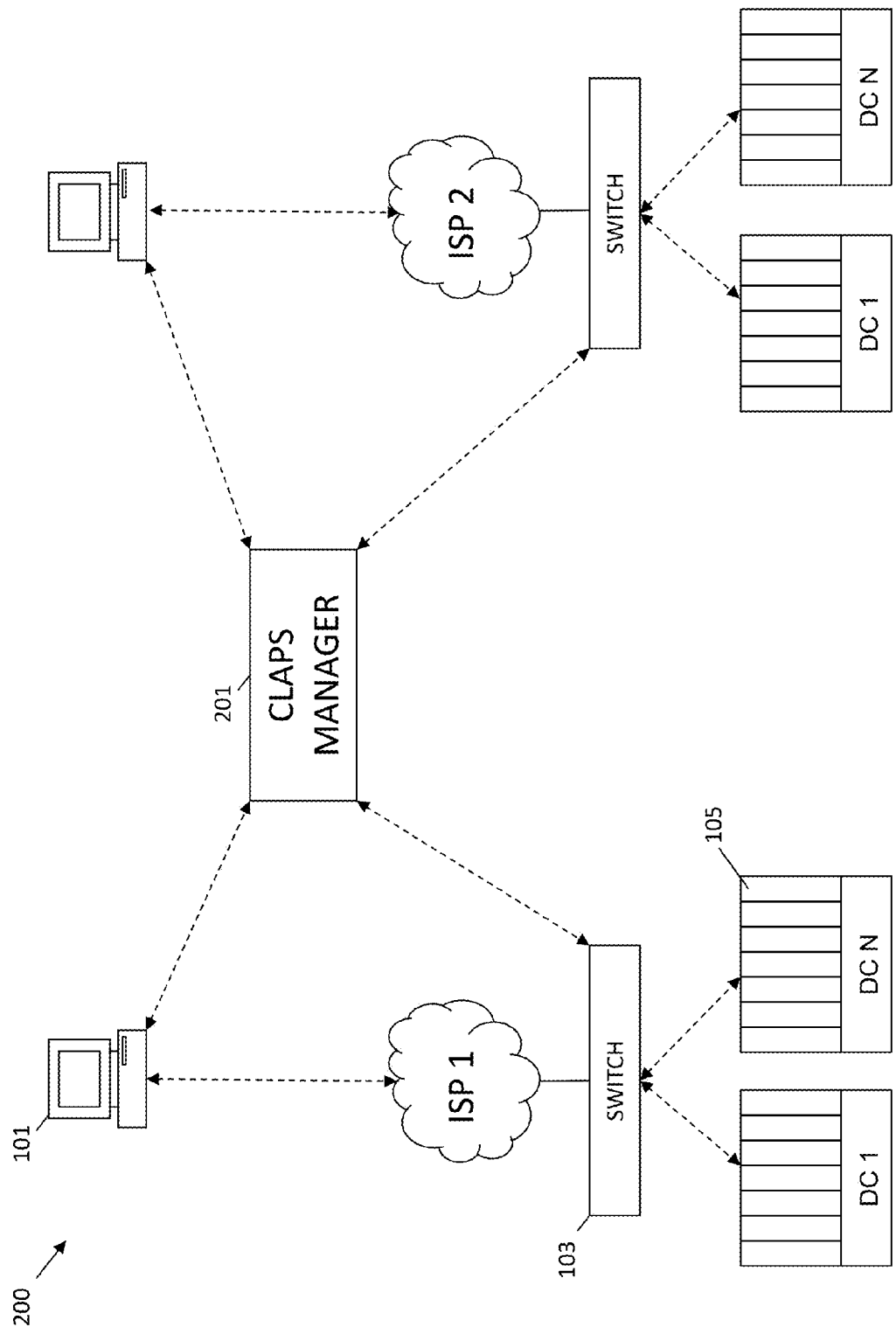
FIG. 2 illustrates a remote gaming environment in accordance with some embodiments.

FIG. 2 illustrates a remote gaming environment 200 in accordance with some embodiments. The remote gaming environment 200 of FIG. 2 is similar to the remote gaming environment 100 of FIG. 1 in that client devices 101 are associated with internet service providers ISP1, ISP2 that provide the infrastructure for servicing remote gaming for users of the client devices 101. Again, each internet service provider ISP1, ISP2 may be associated with a switch 103 that is utilized to assign client devices 101 to corresponding blades 105 of a data center DC. The switch 103 also serves the function of providing a gateway through which client devices 101 and blades 105 of a data center DC may communicate. While only a single switch 103 is depicted as being associated with each internet service provider ISP, it is important to note that multiple switches 103 may be associated with an internet service provider ISP, each of the multiple switches 103 being assigned to one or more corresponding data centers DC.

However, the remote gaming environment 200 of FIG. 2 differs from the remote gaming environment 100 of FIG. 1 in that each client device 101 separately communicates with a cloud local area network party service (CLAPS) manager 201 that oversees the entire remote gaming environment by communicating with switches 103 associated with internet service providers ISP. The CLAPS manager 201 has the capability of implementing cloud local area networks (C-LANs) to client devices 101 who cannot be associated with the same local area network (LAN) based on the remote gaming environments provided by their respective internet service providers ISP1, ISP2. The cloud local area networks (C-LANs) implemented by the CLAPS manager 201 provide a multi-player environment through which those client devices 101 may interact, which will be described in greater detail below.

Figure 3:
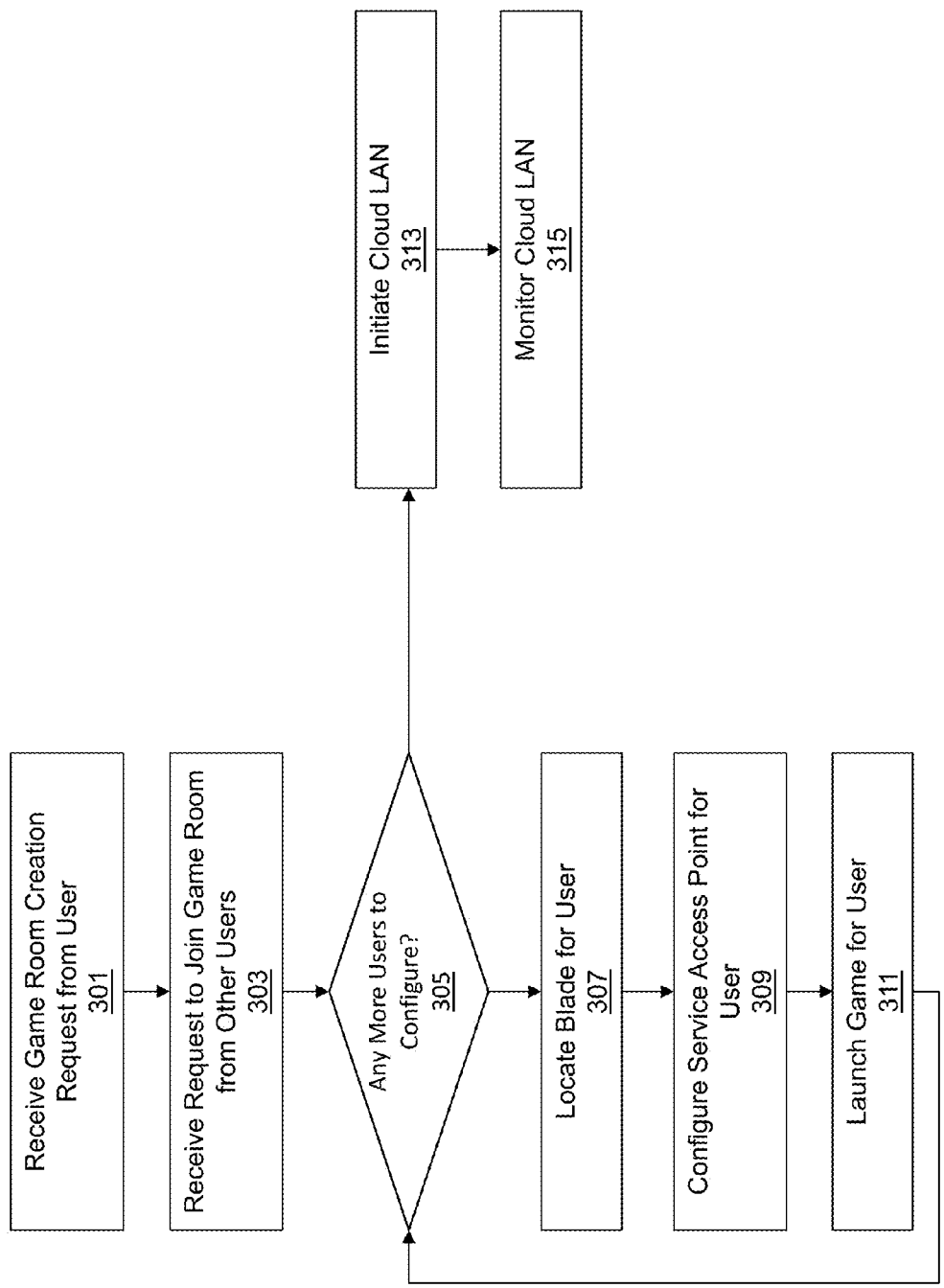
FIG. 3 illustrates a flowchart of a method for implementing a cloud local area network (C-LAN) according to some embodiments.

FIG. 3 illustrates a flowchart of a method for implementing a cloud LAN according to some embodiments. The method of FIG. 3 illustrates how a CLAPS manager implements a cloud LAN for providing a multi-player environment to allow client devices to interact when the client devices cannot be associated with the same local area network (LAN) based on the remote gaming environments provided by their respective internet service providers.

Initially, the CLAPS manager receives a game room creation request from a user of a client device as shown at 301. The game room creation request may include information indicating the game being requested, the total number of players in the game, the gameplay mode and context, etc.

The user of the client device may then invite other users of other client devices to join the game room. In some embodiments, the other client devices may have been assigned to blades that are in close proximity and also of the same data center as the requesting client device. In some other embodiments, the other client devices may have been assigned to blades of the same data center as the requesting client device that are not in close proximity to the blade assigned to the requesting client device. In some other embodiments, the users of the other client devices may have been assigned to blades of a different data center than that of the requesting client device. In some other embodiments, the users of the other client devices may belong to a completely different internet service provider than that of the requesting client device. Regardless of the remote gaming environment provided to the other client devices by their respective internet service providers, the other client devices may interact with the requesting client device in a multi-player environment through a cloud local area network (C-LAN) provided by the CLAPS manager, to be further discussed below.

After the game room request from the user of the client device is received by the CLAPS manager, requests to join the game from other users are received by the CLAPS manager as shown at 303. The CLAPS manager may configure settings for the game room requesting user as well as the other user requesting to join the game room to implement a cloud local area network (C-LAN) for providing a multi-player environment to such users.

Initially, the CLAPS manager makes a determination as to whether any more users are left to configure as shown at 305. In some embodiments, the game room requesting user may indicate to the CLAPS manager when all other users have received invitations and requested to join the game room. In some other embodiments, the CLAPS manager may implement a time-out threshold such that users who request to join the game after the time-out threshold has expired are not configured to interact in the cloud local area network (C-LAN) that provides the multi-player environment.

In configuring settings for a user requesting to create/join a game room, a blade for the user is first located as shown at 307. The blade may be assigned to the user by his internet service provider based on the user's location and client device capabilities. For example, a user may be assigned by his internet service provider to a data center that is in close physical proximity to his corresponding client device. Additionally, the user may be assigned to a blade with graphics processing capabilities based on his device's ability to support such graphics processing capabilities.

A service access point may then be configured for the user as shown at 309. In configuring a service access point, the switch associated with the blade at which the user is located may be configured to provide a dedicated point at which communication with the blade is provided. This point is known as the service access point. Once a cloud local area network (C-LAN) is formed by the CLAPS manager, which will be described in greater detail below, all users interacting within the multi-player environment provided by the cloud local area network (C-LAN) may communicate with each other via their corresponding service access point.

In configuring the service access point for a user, the CLAPS manager may configure several different parameters associated with the service access point to facilitate interaction in a multi-player environment for the user. For example, the CLAPS manager may configure quality of service (QoS) characteristics for the service access point, such that a user of the client device associated with the service access point is provided a particular QoS based on their plan. This may involve providing a guaranteed bandwidth level or priority level to a service access point. Additionally, the CLAPS manager may provide access control lists (ACLs) to a service access point to facilitate management of security associated with the service access point. This may involve identifying entities that are allowed to communicate through the service access point.

The CLAPS manager may also assign a cloud local area network (C-LAN) identifier to the service access point to facilitate communication amongst different service access points of the same cloud local area network (C-LAN). Furthermore, a port number may be assigned to each service access point to facilitate management of interaction between client devices utilizing the same multi-player environment provided by the cloud local area network (C-LAN).

The CLAPS manager may also configure various other parameters associated with the service access point to facilitate interaction in a multi-player environment for the user including maximum transmission unit (MTU), traffic encapsulation (e.g., QnQ, dot1Q), speed (e.g. duplex/simplex), and routing protocol information.

Once a service access point has been configured for a user, the game is launched for the user as shown at 311. In some situations, the user may not have the proper client device settings or internet service provider settings to allow for multi-player gameplay. The CLAPS manager may inform such a user that his request to create/join the game room was unable to be completed.

The CLAPS manager then makes a determination as to whether any more users are left to have their settings configured as shown at 305. If there are more users with settings left to be configured, the CLAPS manager moves to 307 and configures settings for those users in the same manner as described above. It is important to note service access points for different client devices of the same cloud local area network (C-LAN) may be configured using different parameters.

If there are no more users with settings left to be configured, the cloud local area network (C-LAN) is initiated as shown at 313. Initiating the cloud local area network (C-LAN) may involve sharing information amongst the different service access points, such that each service access point of the cloud local area network (C-LAN) understands how and where to communicate with other service access points of the cloud local area network (C-LAN).

After the cloud local area network (C-LAN) is initiated, the cloud local area network (C-LAN) may continue to be monitored by the CLAPS manager as shown at 315. The CLAPS manager may monitor the cloud local area network (C-LAN)

to ensure that each client device is provided the correct QoS and priority through their service access point. Furthermore, the CLAPS manager may provide additional functionality to re-configure the cloud local area network (C-LAN) when a client device or service access point associated with a client device fails, such that other users utilizing the multi-player environment provided by the cloud local area network (C-LAN) can continue gameplay without being affected by the failing device/service access point.

By utilizing the CLAPS manager to implement a cloud local area network (C-LAN) for client devices cannot be associated with the same local area network (LAN) based on the remote gaming environments provided by their respective internet service providers, users of such client devices may interact in a multi-player environment without utilizing a third party server.

Figure 4:
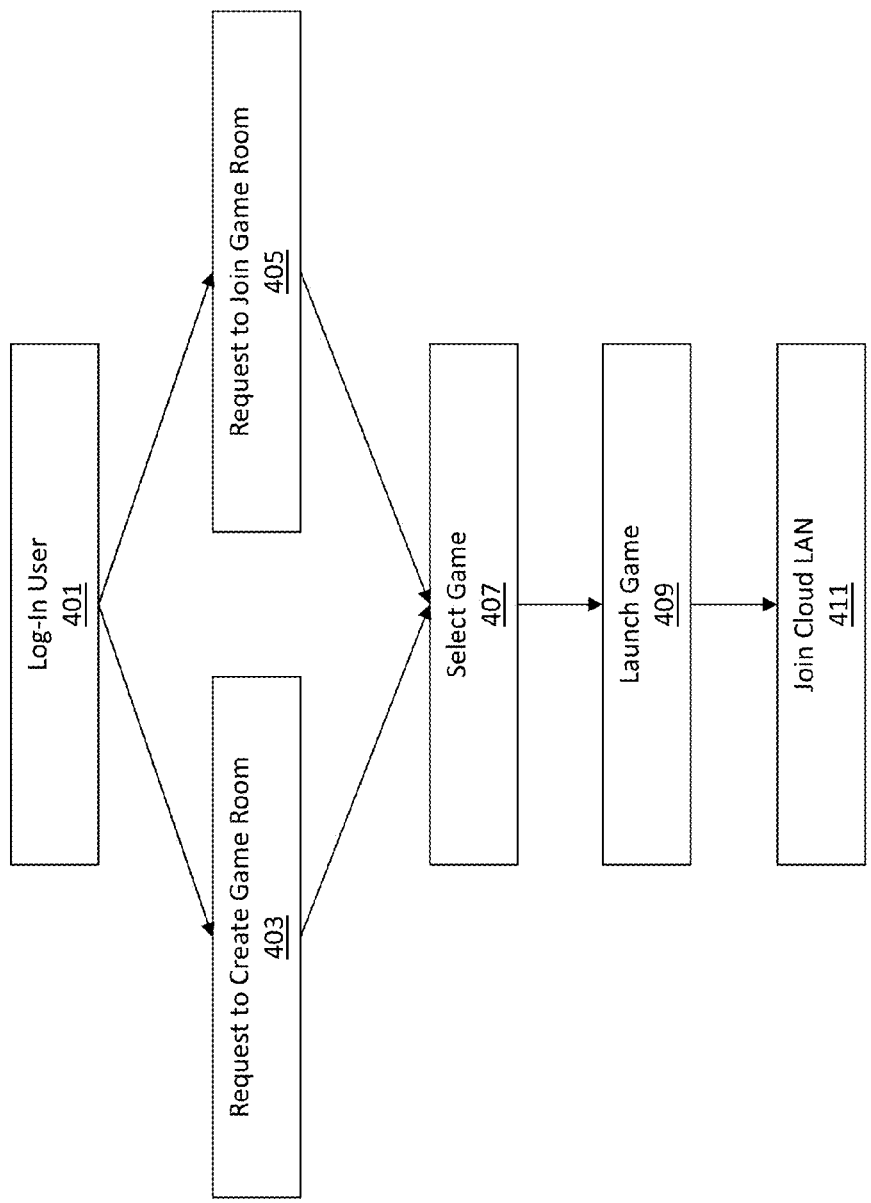
FIG. 4 illustrates a flowchart of a method for implementing a cloud local area network (C-LAN) from a user perspective according to some embodiments.

FIG. 4 illustrates a flowchart of a method for implementing a cloud LAN from a user perspective according to some embodiments. Initially, a user of a client device logs-in to the CLAPS manager as shown in 401. The user of the client device may then request to create a game room as shown at 403. When the user of the client device requests to create a game room, the user may also invite other users of other client devices to join that game room. As previously discussed above, in some embodiments, the other client devices may have been assigned to blades that are in close proximity and also of the same data center as the requesting client device. In some other embodiments, the other client devices may have been assigned to blades of the same data center as the requesting client device that are not in close proximity to the blade assigned to the requesting client device. In some other embodiments, the users of the other client devices may have been assigned to blades of a different data center than that of the requesting client device. In some other embodiments, the users of the other client devices may belong to a completely different internet service provider than that of the requesting client device. Regardless of the remote gaming environment provided to the other client devices by their respective internet service providers, the other client devices may interact with the requesting client device in a multi-player environment through a cloud local area network (C-LAN) provided by the CLAPS manager, as discussed above.

Alternatively, the user of the client device may request to join a game room that has already been requested/created by another user as shown at 405. In some embodiments, the client devices requesting to join the game room may have been assigned to blades that are in close proximity and also of the same data center as the client device requesting creation of the game room. In some other embodiments, the client devices requesting to join the game room may have been assigned to blades of the same data center as the client device requesting creation of the game room that are not in close proximity to the blade assigned to the client device requesting creation of the game room. In some other embodiments, the users of the client devices requesting to join the game room may have been assigned to blades of a different data center than that of the client device requesting creation of the game room. In some other embodiments, the users of the client devices requesting to join the game room may belong to a completely different internet service provider than that of the client device requesting creation of the game room. Regardless of the remote gaming environment provided to the client devices requesting to join the game room by their respective internet service providers, the client devices requesting to join the game room may interact with the client device requesting creation of the game room in a multi-player environment through a cloud local area network (C-LAN) provided by the CLAPS manager, as discussed above.

Once the user of the client device has requested to join/create the game room, a game is selected for that user as shown at 407. When the user of the client device is requesting creation of the game room, the user of the client device may select the game to be played in the multi-player environment provided by the cloud local area network (C-LAN). When the user of the client device is requesting to join a game room, the user of the client device may be associated with a game already selected by the user of the client device requesting creation of the game room.

After the game has been selected for a user, the game is launched as shown at 409. This may involve the CLAPS manager determining which blade the client device is associated with, configuring a service access point for the client device, and launching the game at the blade associated with the client device.

Once the game has been launched, the user of the client device joins the cloud local area network (C-LAN) as shown at 411. The client device or service access point associated with the client device may be provided information related to the cloud local area network (C-LAN) such that the client device or service access point associated with the client device understands how and where to communicate with other client devices or service access points of the cloud local area network (C-LAN).

Figure 5:
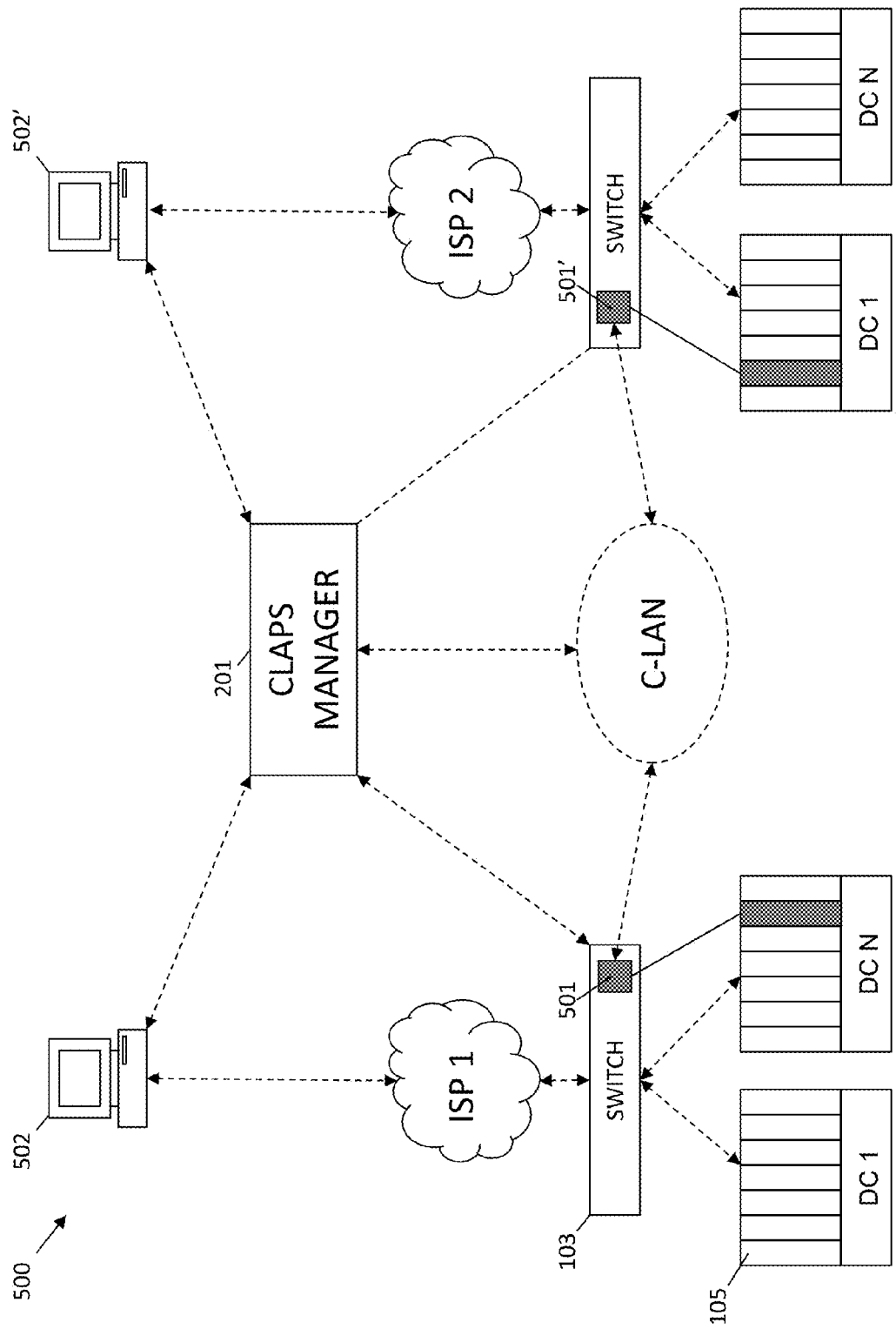
FIG. 5 illustrates a remote gaming environment that implements a cloud local area network (C-LAN) according to some embodiments.
Figure 6:
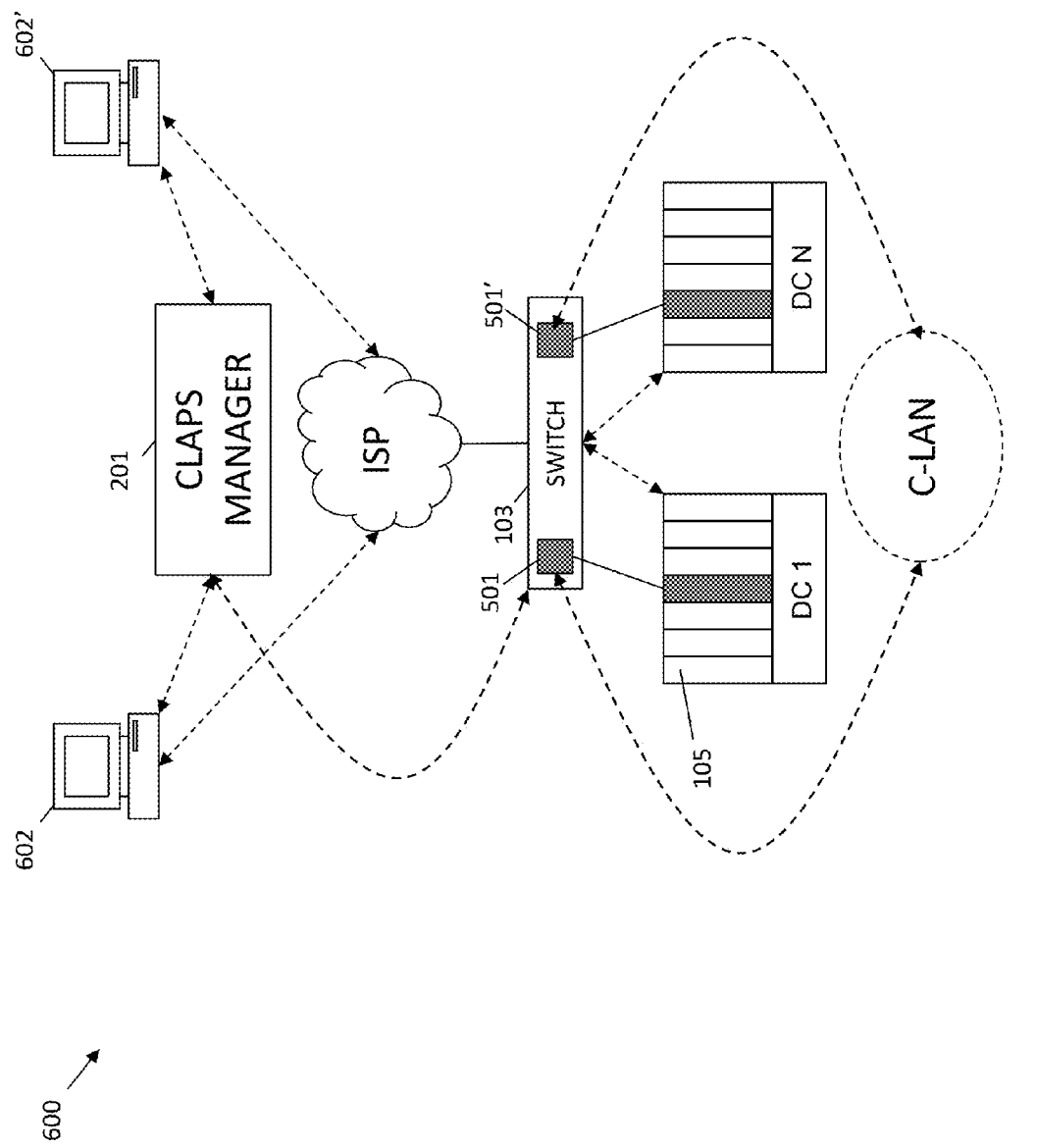
FIG. 6 illustrates an alternative remote gaming environment that implements a cloud local area network (C-LAN) according to some embodiments.
Figure 7:
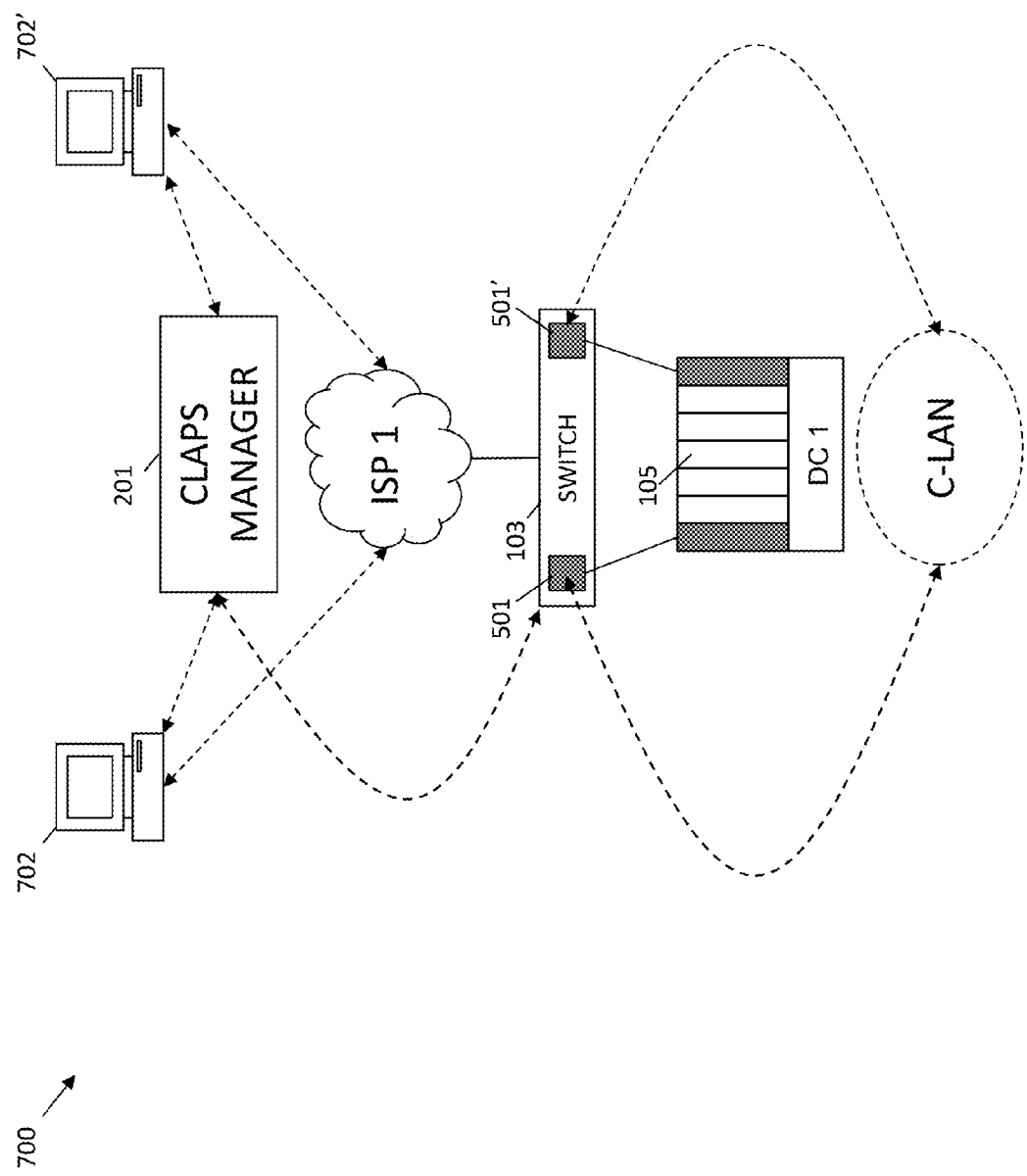
FIG. 7 illustrates an alternative remote gaming environment that implements a cloud local area network (C-LAN) according to some embodiments.

FIGS. 5-7 illustrate alternative remote gaming environments that implement a cloud LAN according to some embodiments. FIG. 5 illustrates a remote gaming environment 500 that implements a cloud local area network (C-LAN) for providing a multi-player environment to two client devices 502, 502' that belong to completely different internet service providers ISP1, ISP2. Because the two client devices 502, 502' are associated with different internet service providers ISP1, ISP2, they cannot be associated with the same local area network (LAN) based on the remote gaming environments provided by their respective internet service providers ISP1, ISP2, and as such cannot interact in a conventional multi-player environment without utilizing a third party server. While only two different client devices are illustrated, one ordinarily skilled in the art will recognize that the remote gaming environment 500 of FIG. 5 may be expanded to support a cloud local area network (C-LAN) that provides a multi-player environment to any number of client devices belonging to any number of different internet service providers.

Each client device 502, 502' is assigned to a corresponding blade 105 by its internet service provider ISP1, ISP2, as depicted by the shaded grey rectangle in FIG. 5. Initially, a blade for each client device 502, 502' is first located by the CLAPS manager 201, as described above. For each client device 502, 502' the CLAPS manager 201 may then configure a corresponding service access point 501, 501' to provide a dedicated point at which communication with the blade associated with that service access point 501, 501' is directed. This is accomplished in the manner described above with respect to FIG. 3.

Once a service access point 501, 501' has been configured for all of the client devices 502, 502', a cloud local area network (C-LAN) is initiated. Initiating the cloud local area network (C-LAN) may involve sharing information amongst the different service access points, such that each service access point of the cloud local area network (C-LAN) understands how and where to communicate with other service access points of the cloud local area network (C-LAN), as discussed above.

After the cloud local area network (C-LAN) is initiated, the cloud local area network (C-LAN) may continue to be monitored by the CLAPS manager. The CLAPS manager may monitor the cloud local area network (C-LAN) to ensure that each client device is provided the correct QoS and priority through their service access point. Furthermore, the CLAPS manager may provide additional functionality to re-configure the cloud local area network (C-LAN) when a client device or service access point associated with a client device fails, such that other users utilizing the multi-player environment provided by the cloud local area network (C-LAN) can continue gameplay without being affected by the failing device/service access point.

By utilizing the CLAPS manager to implement a cloud local area network (C-LAN) for client devices who do not share an internet service provider and thus cannot be associated with the same local area network (LAN) based on the remote gaming environments provided by their respective internet service providers, users of such client devices may interact in a multi-player environment without utilizing a third party server.

FIG. 6 illustrates a remote gaming environment 600 that implements a cloud LAN for providing a multi-player environment to two client devices 602, 602' that belong to the same internet service provider ISP, but are located at different data centers DC. Because the two client devices 602, 602' are located at different data centers DC, they cannot be associated with the same local area network (LAN) based on the remote gaming environments provided by their respective internet service providers ISP, and as such cannot interact in a conventional multi-player environment without utilizing a third party server. While only two different client devices 602, 602' are illustrated, one ordinarily skilled in the art will recognize that the remote gaming environment 600 of FIG. 6 may be expanded to support a cloud local area network (C-LAN) that provides a multi-player environment to any number of client devices belonging to any number of different internet service providers.

Each client device 602, 602' is assigned to a corresponding blade 105 by its internet service provider ISP, as depicted by the shaded grey rectangle in FIG. 6. Initially, a blade 105 for each client device 602, 602' is first located by the CLAPS manager 201, as described above. For each client device 602, 602' the CLAPS manager 201 may then configure a corresponding service access point 501, 501' to provide a dedicated point at which communication with the blade associated with that service access point 501, 501' is directed. This is accomplished in the manner described above with respect to FIG. 3.

Once a service access point 501, 501' has been configured for all of the client devices 602, 602', a cloud local area network (C-LAN) is initiated. Initiating the cloud local area network (C-LAN) may involve sharing information amongst the different service access points, such that each service access point of the cloud local area network (C-LAN) understands how and where to communicate with other service access points of the cloud local area network (C-LAN), as discussed above.

After the cloud local area network (C-LAN) is initiated, the cloud local area network (C-LAN) may continue to be monitored by the CLAPS manager. The CLAPS manager may monitor the cloud local area network (C-LAN) to ensure that each client device is provided the correct QoS and priority through their service access point. Furthermore, the CLAPS manager may provide additional functionality to re-configure the cloud local area network (C-LAN) when a client device or service access point associated with a client device fails, such that other users utilizing the multi-player environment provided by the cloud local area network (C-LAN) can continue gameplay without being affected by the failing device/service access point.

By utilizing the CLAPS manager to implement a cloud local area network (C-LAN) for client devices who do not share a data center and thus cannot be associated with the same local area network (LAN) based on the remote gaming environments provided by their respective internet service providers, users of such client devices may interact in a multi-player environment without utilizing a third party server.

FIG. 7 illustrates a remote gaming environment 700 that implements a cloud LAN for providing a multi-player environment to two client devices 702, 702' that belong to the same internet service provider ISP and data center DC, but are located at blades 105 that are not in close proximity. Because the two client devices 702, 702' are located at blades within the same data center DC that are not in close proximity, they cannot be associated with the same local area network (LAN) based on the remote gaming environments provided by their respective internet service providers ISP, and as such cannot interact in a conventional multi-player environment without utilizing a third party server. While only two different client devices 702, 702' are illustrated, one ordinarily skilled in the art will recognize that the remote gaming environment 700 of FIG. 7 may be expanded to support a cloud local area network (C-LAN) that provides a multi-player environment to any number of client devices belonging to any number of different internet service providers.

Each client device 702, 702' is assigned to a corresponding blade 105 by its internet service provider ISP, as depicted by the shaded grey rectangle in FIG. 7. Initially, a blade 105 for each client device 702, 702' is first located by the CLAPS manager 201, as described above. For each client device 702, 702' the CLAPS manager 201 may then configure a corresponding service access point 501, 501' to provide a dedicated point at which communication with the blade 105 associated with that service access point 501, 501' is directed. This is accomplished in the manner described above with respect to FIG. 3.

Once a service access point 501, 501' has been configured for all of the client devices 702, 702', a cloud local area network (C-LAN) is initiated. Initiating the cloud local area network (C-LAN) may involve sharing information amongst the different service access points, such that each service access point of the cloud local area network (C-LAN) understands how and where to communicate with other service access points of the cloud local area network (C-LAN), as discussed above.

After the cloud local area network (C-LAN) is initiated, the cloud local area network (C-LAN) may continue to be monitored by the CLAPS manager. The CLAPS manager may monitor the cloud local area network (C-LAN) to ensure that each client device is provided the correct QoS and priority through their service access point. Furthermore, the CLAPS manager may provide additional functionality to re-configure the cloud local area network (C-LAN) when a client device or service access point associated with a client device fails, such that other users utilizing the multi-player environment provided by the cloud local area network (C-LAN) can continue gameplay without being affected by the failing device/service access point.

By utilizing the CLAPS manager to implement a cloud local area network (C-LAN) for client devices who are not located at blades that are in close proximity within the same data center and thus cannot be associated with the same local area network (LAN) based on the remote gaming environments provided by their respective internet service providers, users of such client devices may interact in a multi-player environment without utilizing a third party server.

While FIGS. 5-7 illustrate three example remote gaming environments, it is important to note that any number of client devices with any type of remote gaming environment provided by their corresponding internet service provider may utilize a cloud local area network (C-LAN) to interact in a multi-player environment. Furthermore, while FIGS. 2-7 illustrate the CLAPS manager as communicating with switches in order to configure service access points for implementing the cloud local area network (C-LAN), it is important to note that in some embodiments the CLAPS manager may alternatively re-configure the equipment of an internet service provider for implementing the cloud local area network (C-LAN). This may be performed when the ISP equipment natively supports entities that allow virtual private LANs to be created (e.g., VPLS or VLL). Configuring such entities may be accomplished using any management interface that the equipment exposes (e.g., SNMP, CLI, Netconf).

Additionally, while the above description has been provided with reference to multi-player environments related to gaming, it is important to note that the CLAPS manager may implement a cloud local area network (C-LAN) for providing an interactive environment to users of different client devices for any type of video program.

System Architecture Overview

Figure 8:
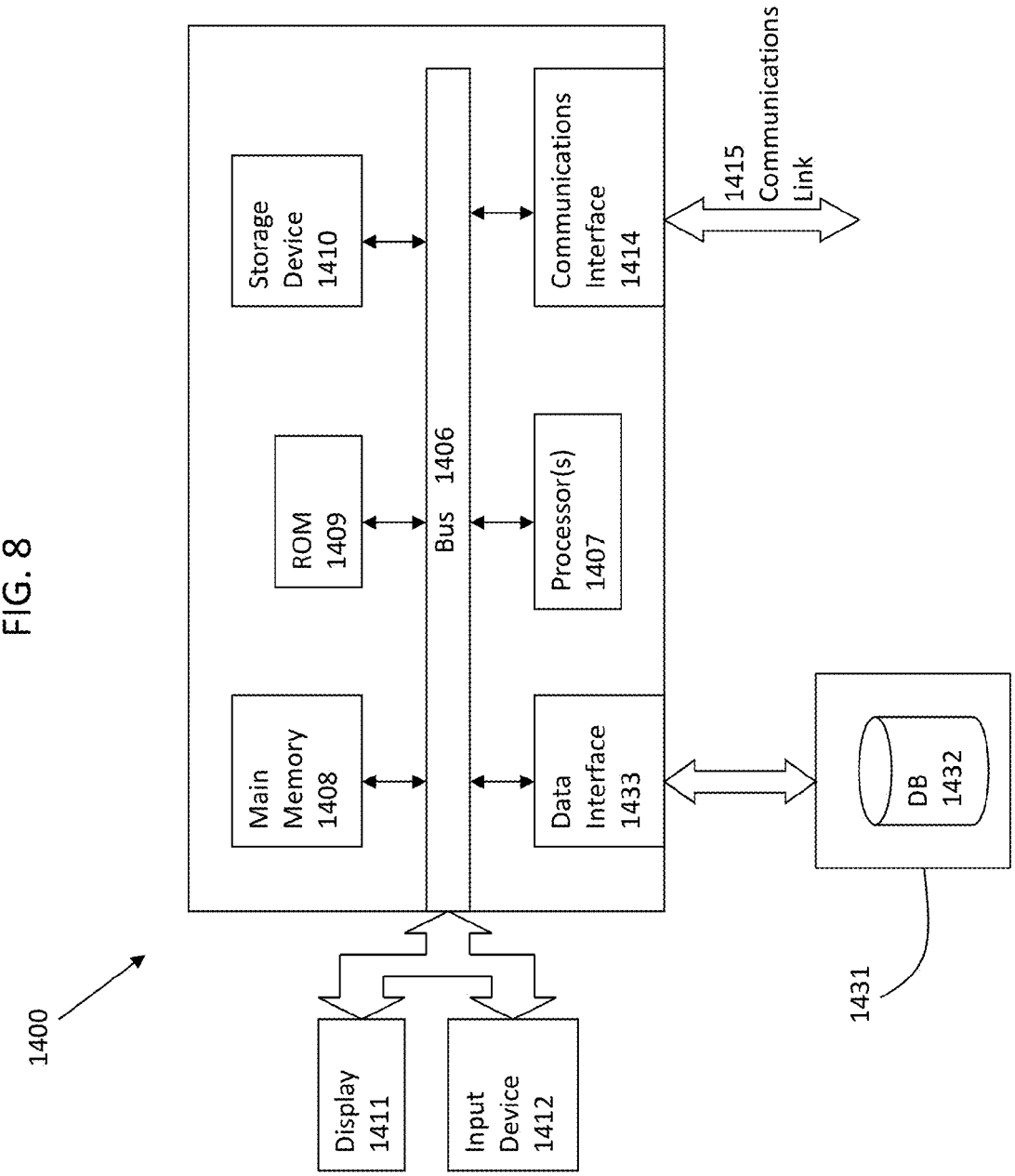
FIG. 8 depicts a computerized system for implementing a cloud local area network (C-LAN).

FIG. 8 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Computer system 1400 may communicate through a data interface 1433 to a database 1432 on an external storage device 1431.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A method employed by a device including a processor for implementing a cloud local area network (C-LAN) providing a multi-player environment for servicing content to a plurality of client devices, the method comprising:
   determining, for each client device of the plurality of client devices, by a cloud local area network party service (CLAPS) manager in communication with the plurality of client devices, a data center assigned to the client device and a location of a blade within the data center assigned to the client device;
   configuring, by the CLAPS manager, a service access point for each client device of the plurality of client devices, based on the data center and the location of the blade assigned to the client device; and
   initializing, by the CLAPS manager, the C-LAN, including each client device of the plurality of client devices, using the service access points for each client device of the plurality of client devices,
   wherein at least two client devices of the plurality of client devices cannot be associated with a same local area network based on remote access environments provided by respective internet service providers of the first and second client devices.

2. The method of claim 1, wherein configuring the service access point for each client device comprises:
   locating a switch associated with the blade assigned to the client device to act as the service access point for the client device; and
   configuring parameters associated with the service access point.

3. The method of claim 2, wherein configuring, by the CLAPS manager, parameters associated with the service access point includes configuring quality of service (QoS) characteristics for the service access point.

4. The method of claim 2, wherein configuring, by the CLAPS manager, parameters associated with the service access point includes providing access control lists (ACLs) to the service access point.

5. The method of claim 2, wherein configuring, by the CLAPS manager, parameters associated with the service access point includes assigning a C-LAN identifier to the service access point.

6. The method of claim 5, wherein configuring, by the CLAPS manager, parameters associated with the service access point further comprises assigning a port number to the service access point.

7. The method of claim 2, wherein configuring, by the CLAPS manager, parameters associated with the service access point includes configuring at least one of maximum transmission unit, traffic encapsulation, speed, or routing protocol information for the service access point.

8. The method of claim 1, wherein at least two client devices of the plurality of client devices are assigned to different blades of the same data center, wherein the different blades are not in close proximity to each other.

9. The method of claim 1, wherein at least two client devices of the plurality of client devices are assigned to blades of different data centers.

10. The method of claim 1, wherein the at least two client devices of the plurality of client devices cannot be associated with a same local area network because they belong to different internet service providers.

11. A computer program product comprising a non-transitory computer usable medium having executable code to execute a method for implementing a cloud local area network (C-LAN) for providing a multi-player environment for servicing content to a plurality of client devices, the method comprising:
   determining, for each client device of the plurality of client devices, by a cloud local area network party service (CLAPS) manager in communication with the plurality of client devices, a data center assigned to the client device and a location of a blade within the data center assigned to the client device;
   configuring, by the CLAPS manager, a service access point for each client device of the plurality of client devices, based on the data center and the location of the blade assigned to the client device; and
   initializing, by the CLAPS manager, the C-LAN, including each client device of the plurality of client devices, using the service access points for each client device of the plurality of client devices;
   wherein at least two client devices of the plurality of client devices cannot be associated with a same local area network based on remote access environments provided by respective internet service providers of the first and second client devices.

12. The computer program product of claim 11, wherein configuring, by the CLAPS manager, the service access point for each client device comprises:
   locating a switch associated with the blade for the client device to act as the service access point for the client device; and
   configuring parameters associated with the service access point.

13. The computer program product of claim 12, wherein configuring parameters associated with the service access point includes configuring quality of service (QoS) characteristics for the service access point.

14. The computer program product of claim 12, wherein configuring parameters associated with the service access point includes providing access control lists (ACLs) to the service access point.

15. The computer program product of claim 12, wherein configuring parameters associated with the service access point includes assigning a C-LAN identifier to the service access point.

16. The computer program product of claim 12, wherein the at least two client devices of the plurality of client devices cannot be associated with the same local area network because they are assigned to different blades of the same data center, and the different blades are not in close proximity to each other.

17. The computer program product of claim 12, wherein the at least two client devices of the plurality of client devices cannot be associated with the same local area network because they are assigned to blades of different data centers.

18. The computer program product of claim 12, wherein the at least two client devices of the plurality of client devices cannot be associated with the same local area network because they belong to different internet service providers.

19. A system for implementing a cloud local area network (C-LAN) for providing a multi-player environment for servicing content to a plurality of client devices, comprising:
   the plurality of client devices;
   a plurality of internet service providers associated with the plurality of client devices;
   a plurality of data centers connected to the plurality of internet service providers, wherein each data center comprises a plurality of blades for servicing content to the plurality of client devices;
   a cloud local area network party service (CLAPS) manager in communication with the plurality of client devices, wherein the CLAPS manager is configured to:
   determine, for each client device of the plurality of client devices, a data center assigned to the client device and a location of a blade within the data center assigned to the client device;
   configure a service access point for each client device of the plurality of client devices based on the data center and the location of the blade assigned to the client device; and
   initialize the C-LAN, including each client device of the plurality of client devices, using the service access points for each client device of the plurality of client devices,
   wherein at least two client devices of the plurality of client devices cannot be associated with a same local area network based on remote access environments provided by respective internet service providers of the first and second client devices.

* * * * *